United States Patent [19]

Griffth et al.

[11] 4,195,166

[45] Mar. 25, 1980

[54] ALKANEDIAMIDE-LINKED POLYPHTHALOCYANINES COORDINATED WITH SnCL$_2$

[75] Inventors: James R. Griffth, Riverdale; Jacques G. O'Rear, Temple Hills, both of Md.

[73] Assignee: The United State of America as represented by the Secretary of the Navy, Washington, D.C.

[21] Appl. No.: 954,031

[22] Filed: Oct. 23, 1978

[51] Int. Cl.$^2$ .................... C08G 73/06; C08G 79/12
[52] U.S. Cl. .................... 528/362; 260/37 N; 260/45.75 E; 528/271; 528/395; 528/341; 528/336
[58] Field of Search .................... 528/362, 271, 395; 260/45.75 E

[56] References Cited

U.S. PATENT DOCUMENTS

| | | | |
|---|---|---|---|
| 3,993,631 | 11/1976 | Griffith et al. | 528/362 |
| 4,056,560 | 11/1977 | Griffith et al. | 528/362 |
| 4,067,860 | 1/1978 | Griffith et al. | 528/362 |

*Primary Examiner*—Harold D. Anderson
*Attorney, Agent, or Firm*—R. S. Sciascia; Philip Schneider; Thomas McDonnell

[57] ABSTRACT

A polphthalocyanine with the structure formula:

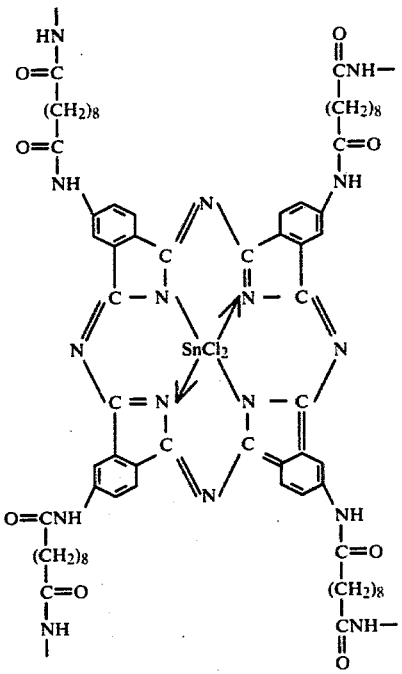

prepared by mixing SnCl$_2$.2H$_2$O with N, N'-bis(3,4-dicyanophenyl)decane diamide of which the structural formula is:

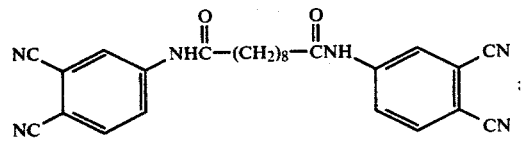

heating the mixture to a temperature from about 175° C. to about 185° C. for about 15 to 20 minutes to form a resin; and curing the resin at a temperature from about 190° C. to about 230° C. The polyphthalocyanine is useful as an adhesive, as a matrix for glass or carbon-fiber reinforced composites, and as structural material.

1 Claim, No Drawings

ALKANEDIAMIDE-LINKED POLYPHTHALOCYANINES COORDINATED WITH SNCL$_2$

BACKGROUND OF THE INVENTION

This invention pertains generally to high-temperature and high-strength plastics and in particular to polyphthalocyanine plastics.

The polyphthalocyanines disclosed and claimed in U.S. Pat. Nos. 3,993,631 and 4,067,860 by James R. Griffith and Jacques G. O'Rear have numerous advantages over polyepoxies and other high-temperature and high-strength plastics. These compounds can withstand temperatures up to 200° C. with no degradation, up to 250° C. with slight degradation, and up to 350° C. with moderate degradation. As adhesives, they remain effective at temperatures above 200° C.

Polyphthalocyanines are prepared by heating an orthodicyanophenyl diamide at a temperature from 200° C. to 240° C. or by mixing this diamide with a metal or salt. Generally, cures with a higher temperature and/or with a salt or metal are quicker, but no cure time is less than about twenty four hours. Many polyphthalocyanines require cure times as long as forty eight hours.

Polyphthalocyanines which are prepared by admixing a metal or salt with a bisorthodicyanophenyl diamide often have the problem of trapped gas in the final polymer. This problem is particularly prevalent with salts.

Many of the known metals and salts do not disperse evenly throughout the bisorthodicyanophenyl diamide and consequently cause the diamide to polymerize unevenly. The resulting polymer has poor properties, e.g., weakness on account of a lack of homogeneity. This problem is minimized by a careful mixing of the salt or metal. This problem is particularly prevalent among salts. In fact, some salts, e.g., stannous chloride have not been successfully reacted with a bisorthodicyanophenyl diamide to form a useful polyphthalocyanine.

Like most plastics, these compounds are not self-extinguishing. This disadvantage is not as great as it is with other plastics, such as, polyepoxies on account of their exceptional thermal stability and heavy charring. However, a problem does exist because these compounds do burn at temperatures found in many fires, e.g., around 1000° C. or more.

SUMMARY OF THE INVENTION

It is, therefore, an object of the present invention to provide a polyphthalocyanine with a cure time not in excess of sixteen hours.

Another object of the present invention is to provide a polyphthalocyanine which is self-extinguishing.

A further object is to provide a SnCl$_2$-coordinated polyphthalocyanine which is as homogeneous as any other polyphthalocyanine.

These and other objects are achieved by a mixing a compound which decomposes to stannous chloride and which allows a thorough molecular dispersion throughout a quantity of a N,N'-bis(3,4-dicyanophenyl) alkane diamide; by heating and mixing the mixture at a temperature sufficiently low and for a length of time sufficiently long to eliminate the unreacted decomposition products of the stannous chloride reactant and to form a resin; and by curing the resin at a temperature from about 190° C. to about 230° C.

DETAILED DESCRIPTION OF THE INVENTION

Forming a polyphthalocyanine by reacting a N,N'-bis(3,4-dicyanophenyl) alkanediamide with stannous chloride was not practical on account of a lack of dispersibility of stannous chloride in the diamide and the catalytic effect of stannous chloride on the phthalocyanine-formation reaction. Consequently, the result produced by mixing stannous chloride with the above diamide was a solid comprising concentrations of stannous chloride, some unreacted diamide, polyphthalocyanine, and stannous chloride-coordinated polyphthalocyanine. This product had poor strength and reliability.

It has been discovered that stannous chloride dihydrate is able to quickly and thoroughly disperse throughout N,N'-bis(3,4-dicyanophenyl) decanediamide. If the initial heating of the mixture is at about 175° to about 185° C. and preferably from 175° C. to 180° C. for about 15 to 20 minutes, the vaporized water escapes leaving stannous chloride with excellent molecular dispersion throughout the resin. These three features overcome the major difficulties of obtaining a uniform mixture of salt and diamide and of eliminating the vapor created by the decomposition of stannous chloride dihydrate.

In other words, the excellent molecular dispersion allows the polyphthalocyanine reaction to proceed uniformly in the usual manner throughout the reaction mixture without entrapping any significant amount of gas. The mechanism for the present synthesis is the same as the previous polyphthalocyanine syntheses. A phthalocyanine nucleus is formed around the SnCl$_2$ and the formula for the nucleus is as follows:

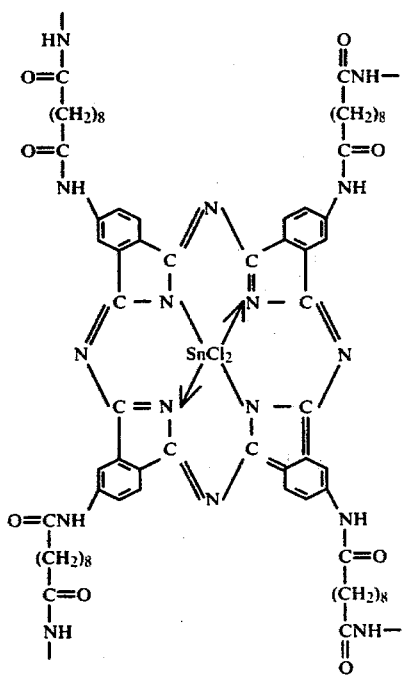

A cured polymer is formed by the following reaction:

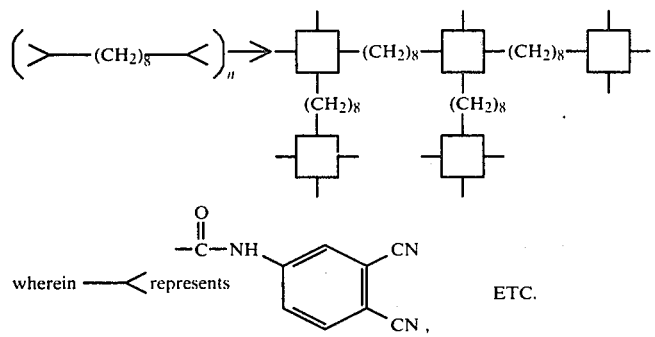

wherein —< represents $-\overset{\overset{O}{\|}}{C}-NH-$ [phenyl with CN, CN] ETC.

□ represents a phthalocyanine nucleus, and n is any integer. As with previous phthalocyanines, the separation between the phenyl dinitrile groups allows the polymerization to proceed to completion. Consequently, a polymer of any size can be prepared.

The starting material, N,N'-bis(dicyanophenyl) decanediamide is prepared according to the method disclosed in U.S. Pat. No. 4,056,560 by James R. Griffith and Jacques G. O'Rear, which is incorporated herein by reference. It is preferred that the diamide as well as stannous chloride is ground to a particle size not greater than about 100 microns, in order to ensure an intimate mixture of the two starting materials. It is also preferred that stannous chloride dihydrate is melted and filtered prior to grinding. Of course, the dihydrate should not be heated to its decomposition temperature. A temperature from 38° C. to 50° C. is adequate to melt the dihydrate without any decomposition.

The polyphthalocyanine of the present invention is prepared by mixing stannous chloride dihydrate ($SnCl_2.2H_2O$) with N,N'-bis(dicyanophenyl) decanediamide in about stoichiometric amounts (diamide/$SnCl_2$-mole ratio of 2:1) to form an intimate mixture of the two. The mixture is heated to a temperature from about 175° C. to about 185° C. and preferably from 175° C. to 180° C. for about 15 to 20 minutes. Vapor comprising mostly of water is given off and an amber resin is formed with a melting point of about 120° C. to 150° C. This resin can be referred to as a B-stage resin. Heating the resin at a temperature from about 190° to about 230° C. produces a fully cured polyphthalocyanine.

In actual use, the mixture is reacted to the B-stage resin. The resin is solidified by cooling and stored in a container opaque to u.v. light and at temperatures below 50° C. A polyphthalocyanine coating or adhesive or other use is made by grinding the resin, which is frangible, and applying the powder in an appropriate manner. The powder is heated to a temperature from about 190° C. to about 230° C. and preferably from 190° C. to 200° C. for about 16 hours or until cured. Of course, it is also possible to cure the resin immediately following the formation of the resin.

To further illustrate the practice of the present invention the following example is given. It is understood that this example is given by way of illustration and is not meant to limit the disclosure or the claims to follow in any manner.

EXAMPLE

An intimate mixture of N,N'-bis(3,4-dicyanophenyl) decanediamide (120.0 g, 0.256 moles) and stannous chloride dihydrate (299 g, 0.133 mole) was prepared with mortar and pestle. About 40 g of this mixture was tightly packed in an open test tube (38 mm OD×200 ml). The mixture was tightly packed in order to ensure excellent heat transfer. The test tube was transferred to a silicone bath with a temperature of about 180° C. After about 10 minutes the mixture was stirred for about 20 minutes. This heating and stirring quantitatively removed the water of hydration and left a light amber-colored slurry. At this point the test tube was stoppered, in order to prevent water from returning to the resin, and was cooled to room temperature.

The resulting frangible beige-colored resin readily melted at a temperature of about 150° C. When the resin was heated to about 190° C. for 16 hours, a tough dark-green solid was obtained. Analysis by infrared spectroscopy produced spectra similar to other polyphthalocyanines and established the homogenous distribution of $SnCl_2$ throughout the polymer.

A 3 cm by 8 cm bar of the polymer was placed in a Bunsen burner until combustion occurred. Upon withdrawal from the flame, the combustion was extinguished. Although all polyphthalocyanines are difficult to burn, this is the only polyphthalocyanine found to be self-extinguishing. Preliminary hardness tests and adhesive test show that the present polyphthalocyanine is comparable with previous ones.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A polyphthalocyanine resin having a nucleus represented by the structural formula:

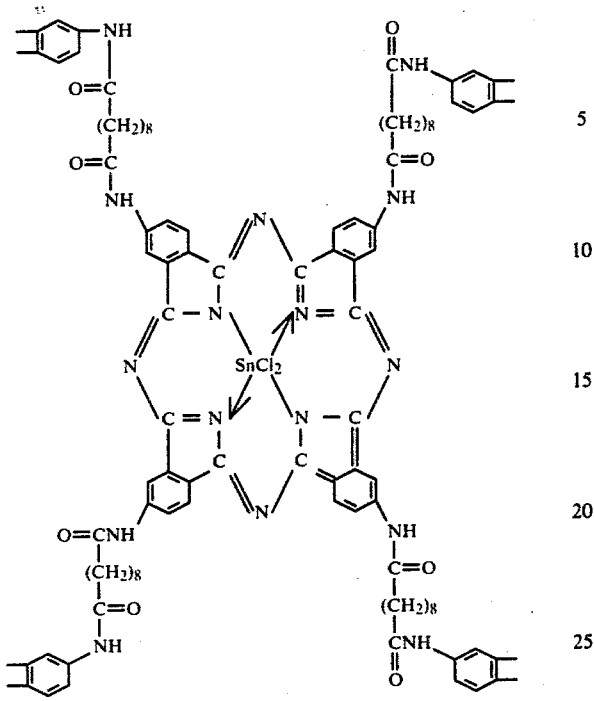
* * * * *